(12) United States Patent
Tang et al.

(10) Patent No.: US 11,714,313 B1
(45) Date of Patent: Aug. 1, 2023

(54) DISPLAY DEVICE AND ELECTRONIC APPARATUS

(71) Applicant: HKC CORPORATION LIMITED, Shenzhen (CN)

(72) Inventors: Rong Tang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/086,619

(22) Filed: Dec. 21, 2022

(30) Foreign Application Priority Data

Apr. 25, 2022 (CN) .......................... 202210438709.4

(51) Int. Cl.
*G02F 1/1335* (2006.01)
*G02F 1/1333* (2006.01)

(52) U.S. Cl.
CPC .... *G02F 1/133531* (2021.01); *G02F 1/13338* (2013.01)

(58) Field of Classification Search
CPC .................. G02F 1/133531; G02F 1/13338

USPC .............................................. 349/58–60, 199
See application file for complete search history.

(56) References Cited

U.S. PATENT DOCUMENTS

2020/0310210 A1* 10/2020 Zhang .................... H10K 59/50

* cited by examiner

*Primary Examiner* — Charles S Chang (57) ABSTRACT

A display device and an electronic apparatus are disclosed. The display device includes a display panel and two polarizers. At least one polarizer includes: a body defining an opening corresponding to a camera; and a magnetic orientation unit that is arranged corresponding to the opening and that includes magnetic bars and an orientation control unit used to generate a magnetic field after being energized to control rotation of the magnetic bars. When the orientation control unit is energized, the magnetic bars are rotated and arranged regularly forming an oriented slit perpendicular to the oriented slit of the opposite polarizer, so that the region corresponding to the camera is in an opaque state. When the orientation control unit is not energized, the magnetic bars are arranged disorderly and not perpendicular to the oriented slit of the opposite polarizer, so that the region corresponding to the camera is in a light-transmitting state.

18 Claims, 4 Drawing Sheets

DISPLAY DEVICE AND ELECTRONIC APPARATUS

CROSS-REFERENCE TO RELATED APPLICATIONS

This application claims the priority and benefit of Chinese patent application 2022104387094, entitled "Display Device and Electronic Apparatus" and filed Apr. 25, 2022 with China National Intellectual Property Administration, the entire contents of which are incorporated herein by reference.

TECHNICAL FIELD

The present application relates to the field of display technology, and in particular, to a display device and an electronic apparatus.

BACKGROUND

The description provided in this section is intended for the mere purpose of providing background information related to the present application but doesn't necessarily constitute prior art.

With the rapid development of display technology, liquid crystal display has become the most widely used display technology at present, and people's requirements for display technology are getting higher and higher, and full-screen display has gradually entered people's field of vision.

At present, mobile electronic devices such as mobile phones and laptops play an important role in our lives. Not only full-screen display, users have higher and higher requirements for appearance. Taking mobile phones, under-screen cameras are increasingly pursued by major manufacturers and users. Even for TV panels, adding cameras has become a trend. In the field of LCD (Liquid Crystal Display) display, the research and arrangement of the camera under the screen is restricted. The main reason lies in the display principle of LCD. The upper and lower polarizers have a shading effect. Therefore, setting the under-screen camera in the LCD will seriously affect the light transmittance of the under-screen camera due to the existence of the upper and lower polarizers, thereby affecting the imaging effect of the camera. Therefore, the above problem remains to be solved.

SUMMARY

It is therefore a purpose of the present application to provide a display device and an electronic apparatus capable of realizing an under-screen camera.

The present application discloses a display device including a display panel and two polarizers. The display panel is arranged between the two polarizers. At least one of the polarizers includes a polarizer body, and the polarizer body is provided with an opening corresponding to the camera. The polarizer further includes a magnetic orientation unit, which is arranged corresponding to the opening. The magnetic orientation unit includes a magnetic bar structure and an orientation control unit. The magnetic bar structure includes a plurality of magnetic bars. The orientation control unit is used to generate a magnetic field after being energized to control the rotation of the magnetic bars. When the orientation control unit is energized, the magnetic bars are rotated and arranged to form an oriented slit, which is perpendicular to an oriented slit of the opposite polarizer. When the orientation control unit is not energized, the magnetic bars are arranged disorderly and are not perpendicular to the oriented slit of the oppositely arranged polarizer.

Optionally, the orientation control unit includes an iron core unit, an electric coil and a support film. The magnetic bar is arranged in the support film. The electric coil is wound on the iron core unit to generate a magnetic field after being energized. The iron core unit is sleeved on the periphery of the support film.

Optionally, the magnetic bar is made of a soft magnetic material.

Optionally, the support film includes an upper support film and a lower support film. The upper support film is attached to the lower support film. The lower support film is provided with grid-like grooves. The openings of the grid-shaped grooves face towards the upper support film, and form a plurality of closed spaces with the upper support film. The magnetic bars are arranged in the closed spaces, and are in one-to-one correspondence with the plurality of the closed spaces. The cross-sectional area of each closed space is larger than the circular area swept by the respective magnetic bar when the magnetic bar rotates with the length of the magnetic bar as the radius.

Optionally, the electrical coil includes a first coil and a second coil. The first coil and the second coil are respectively wound on the iron core unit and arranged on opposite sides. The magnetic fields generated by the first coil and the second coil have the same direction.

Optionally, the magnetic orientation unit is only arranged on the polarizer adjacent to the camera. When the orientation control unit is energized, the oriented slit formed by the rotation of the magnetic bars are perpendicular to the oriented slit of the oppositely arranged polarizer. When the orientation control unit is not energized, the magnetic bars of the magnetic orientation unit are arranged disorderly.

Optionally, the two polarizers are each provided with the magnetic orientation unit, and the two magnetic orientation units are oppositely arranged. When the orientation control unit is energized, the oriented slit formed by the rotation of the magnetic bars of one of the magnetic orientation units is perpendicular to the oriented slit formed by the rotation of the magnetic bars of the opposite magnetic orientation unit. When the orientation control unit is not energized, the magnetic bars of the two magnetic orientation units are arranged disorderly.

Optionally, the area of the magnetic orientation unit on the polarizer adjacent to the outside light incident side is larger than the area of the magnetic orientation unit on the polarizer away from the outside light incident side.

Optionally, the magnetic orientation unit is disposed in the opening, and the outer wall of the iron core unit is attached to the inner wall of the opening.

The present application further discloses an electronic apparatus, including a camera and the above-mentioned display device, wherein the camera is disposed corresponding to the opening of the display device.

Due to the existence of the polarizers, the camera under the screen will not have enough incident light, which will affect the imaging problem when the camera is in use. In the present application, at least one polarizer is provided with an opening at the position corresponding to the camera, and a soft magnetic orientation unit including a magnetic bar structure and an orientation control unit is arranged at the opening position. The orientation control unit is used to generate a magnetic field after being energized, and the orientation control unit controls the magnetic bars in the magnetic bar structure to rotate and arrange regularly to form an oriented slit. When the oriented slit of the magnetic orientation unit 130 is perpendicular to the oppositely arranged polarizer, all regions of the two polarizers are in an opaque state, and at this time, the outside light cannot pass through the polarizers. When the orientation control unit is not energized, the orientation control unit does not generate a magnetic field, the magnetic bars in the magnetic bar structure are arranged disorderly, and the oriented slit of the magnetic orientation unit are not perpendicular to the oppositely arranged polarizer. The region corresponding to the opening portion and the oppositely arranged polarizers has a light-transmitting function, and external light can pass through the region, so that the light transmittance of the region corresponding to the opening portion can be adjusted, so that the display device has a function suitable for an under-screen camera.

BRIEF DESCRIPTION OF DRAWINGS

The accompanying drawings, which are included to provide a further understanding of the embodiments of the present application, constitute a part of the specification, are used to illustrate the embodiments of the present application, and together with the entirely of the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

It should be understood that the terms used herein, the specific structures and function details disclosed herein are intended for the mere purposes of describing specific embodiments and are relatively representative. However, this application should not be construed as being limited to the embodiments set forth herein.

The present application discloses an electronic apparatus, including a camera and a display device. The display device is provided with an opening, and the camera is disposed corresponding to the opening of the display device. Hereinafter this application will be described in further detail with reference to the accompanying drawings and some optional embodiments for a display device applied to a camera.

Figure 1:
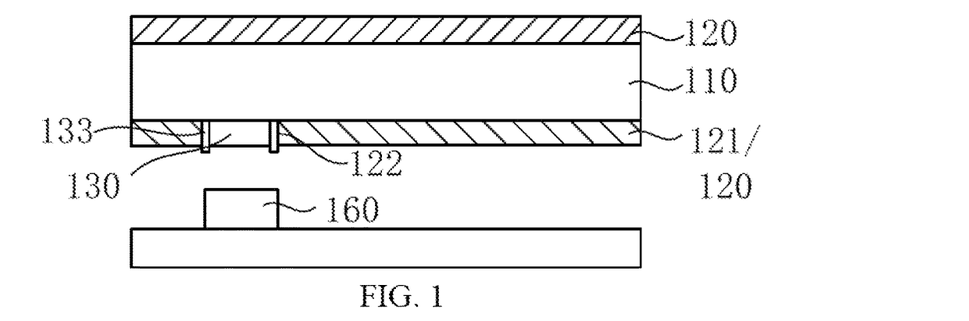
FIG. 1 is a schematic diagram of a display device provided by a first embodiment of the present application.
Figure 8:
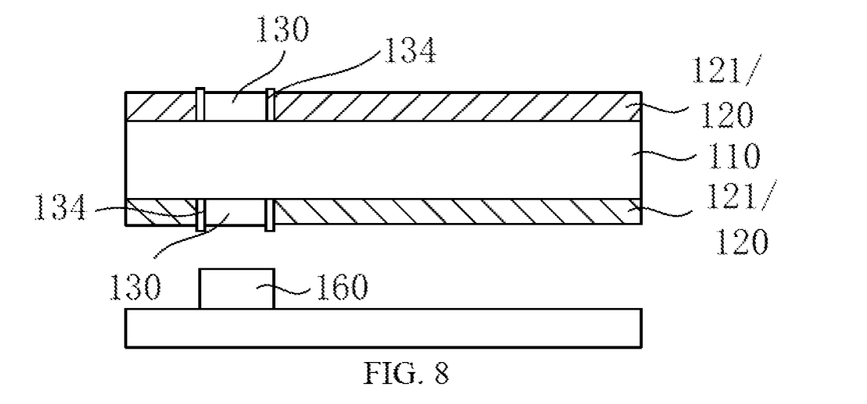
FIG. 8 is a schematic diagram of a display device provided by a second embodiment of the present application.
Figure 10:
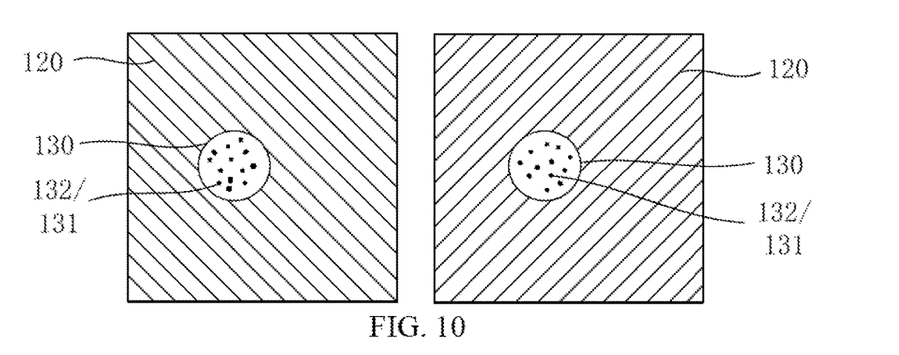
FIG. 10 is a schematic diagram of a non-oriented state of a magnetic orientation unit region of the polarizer provided by the second embodiment of the present application.

As shown in FIG. 1, FIG. 8 and FIG. 10, the present application discloses a display device 10. The display device 10 includes a display panel 110 and two polarizers 120, and the display panel 110 is disposed between the two polarizers 120. At least one of the polarizers 120 includes a polarizer body 121, and the polarizer body 121 is provided with an opening 122 corresponding to the camera 160. The polarizer 120 further includes a magnetic orientation unit 130, which is disposed corresponding to the opening 122. The magnetic orientation unit 130 includes a magnetic bar structure 131 and an orientation control unit 133. The magnetic bar structure 131 includes a plurality of magnetic bars 132. The orientation control unit 133 is used to generate a magnetic field after being powered on, and to control the rotation of the magnetic bars 132. When the orientation control unit 133 is energized, the magnetic bars 132 are rotated and arranged to form an oriented slit 135, which is perpendicular to the oriented slit 135 of the opposite polarizer 120, that is, the magnetic orientation unit 130 is in an oriented state and is opaque meaning it doesn't allow light to transmit. When the orientation control unit 133 is not energized, the magnetic bars 132 are arranged disorderly and are not perpendicular to the oriented slit 135 of the opposite polarizer 120, that is, the magnetic orientation unit 130 is in a non-oriented state and can transmit light.

In the present application, at least one polarizer 120 is provided with an opening 122 at the position corresponding to the camera 160, and a soft magnetic orientation unit 130 including a magnetic bar structure 131 and an orientation control unit 133 is arranged at the opening 122 position. The orientation control unit 133 is used to generate a magnetic field after being energized, and the orientation control unit 133 controls the magnetic bars 132 in the magnetic bar structure 131 to rotate and arrange regularly to form an oriented slit 135. When the oriented slit 135 of the magnetic orientation unit 130 is perpendicular to the oppositely arranged polarizer 120, all regions of the two polarizers 120 are in an opaque state, and at this time, the outside light cannot pass through the polarizers. When the orientation control unit 133 is not energized, the orientation control unit 133 does not generate a magnetic field, the magnetic bars 132 in the magnetic bar structure are arranged disorderly, and the oriented slit 135 of the magnetic orientation unit 130 is not perpendicular to the oppositely arranged polarizer 120. The region corresponding to the opening portion 122 and the oppositely arranged polarizers 120 has a light-transmitting function, and external light can pass through the region, so that the light transmittance of the region corresponding to the opening portion 122 can be adjusted, so that the display device 10 has a function suitable for an under-screen camera.

Figure 2:
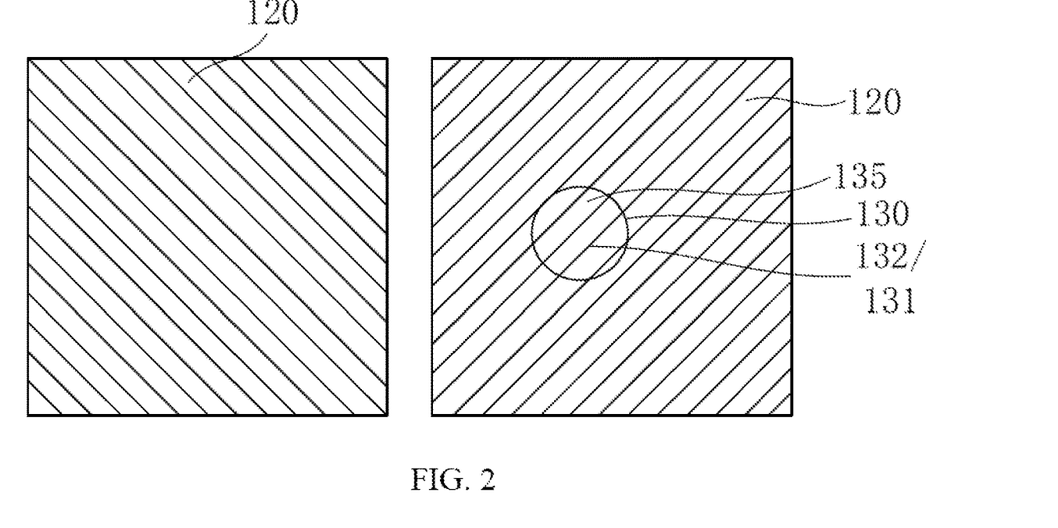
FIG. 2 is a schematic diagram of an oriented state of a polarizer of the display device provided by the first embodiment of the present application.
Figure 3:
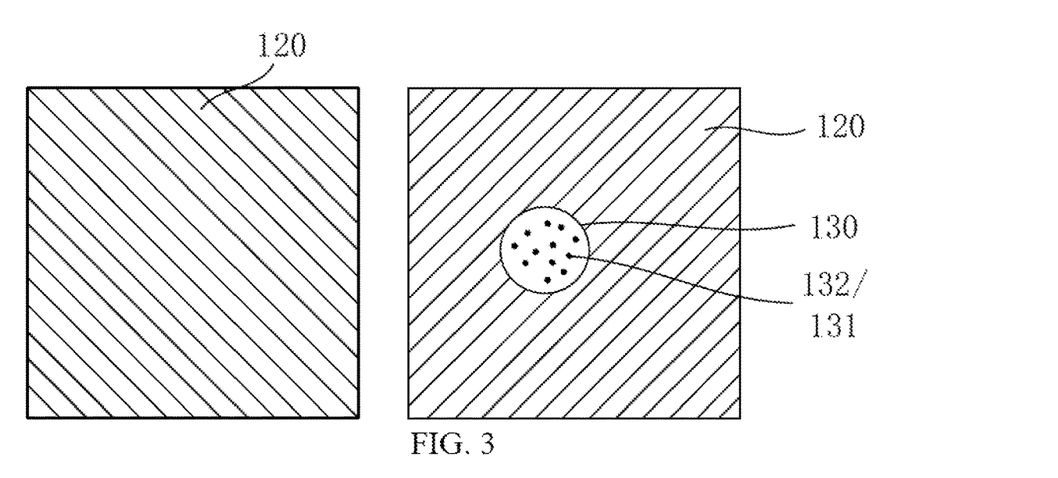
FIG. 3 is a schematic diagram of a non-oriented state of a magnetic orientation unit region of the polarizer provided in the first embodiment of the present application.

Embodiment 1:

Referring to FIGS. 1 to 3, in the display device 10 of this embodiment, only one polarizer 120 is provided with the magnetic orientation unit 130, and the magnetic orientation unit 130 is only disposed on the polarizer 120 adjacent to the camera 160. When the orientation control unit 133 is energized, the oriented slit 135 formed by the rotation of the magnetic bars 132 is perpendicular to the oriented slit 135 of the opposite polarizer 120. At this time, all regions of the two polarizers 120 are in a state where the oriented slits 135 are perpendicular to each other, so that the region corresponding to the camera 160 is in an opaque state, and the camera 160 is in a non-operating state at this time. When the orientation control unit 133 is not energized, the magnetic bars 132 of the magnetic orientation unit 130 are arranged disorderly, that is, the magnetic orientation unit 130 is in a non-oriented state. Even if the oppositely arranged polarizer is still in the oriented state, the region corresponding to the camera 160 is in a light-transmitting state at this time, and the camera 160 is in a working state at this time to realize the imaging function. If the magnetic orientation unit 130 is arranged on the polarizer 120 on the side of the light incident surface of the outside world, the oriented state change of the magnetic bars132 due to the orientation control unit 133 being energized or not being energized can be easily perceived. Therefore, arranging the magnetic orientation unit 130 only on the polarizer 120 adjacent to the camera 160 can ensure the effect of changing the oriented state of the region corresponding to the camera while being difficult to perceive, so as to realize the function of the under-screen camera 160. Of course, it is also possible to only dispose the magnetic orientation unit on the polarizer 120 on the side of the outside light incident surface.

Figure 4:
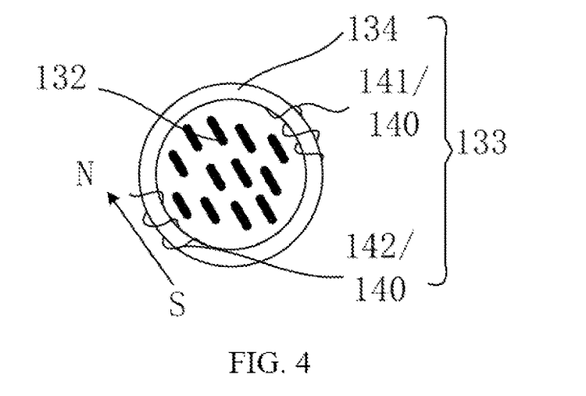
FIG. 4 is a schematic diagram of the magnetic orientation unit provided in the first embodiment of the present application in an oriented state.
Figure 5:
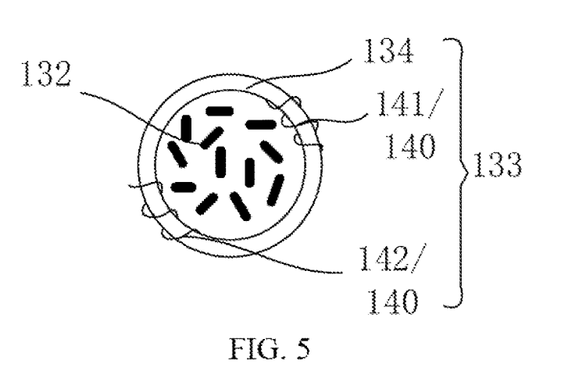
FIG. 5 is a schematic diagram of the magnetic orientation unit provided in the first embodiment of the present application in a non-oriented state.

Specifically, FIG. 4 is a schematic diagram of the magnetic orientation unit provided by the first embodiment of the present application in an oriented state, and FIG. 5 is a schematic diagram of the magnetic alignment unit provided by the first embodiment of the present application in a non-oriented state. As shown in FIG. 1, the magnetic orientation unit 130 is arranged in the opening portion 122. Referring to FIGS. 4-5, the orientation control unit 133 includes an iron core unit 133, an electric coil 140 and a support film 150. The magnetic bars 132 are arranged in the support film 150. The electric coil 140 is wound on the iron core unit 133 to generate a magnetic field after being energized. The iron core unit 133 is sleeved on the periphery of the support film 150. The outer wall of the core unit 133 is attached to the inner wall of the opening portion 122. The magnetic bars 132 are carried by the support film 150, in addition to ensuring that the magnetic bars 132 have a supporting and fixing structure, on the one hand, the support film 150 is further stabilized by the iron core unit 133, and the electric coil 140 is wound outside the iron core unit 133. After being energized, by controlling the direction of the current, a magnetic field pointing from the S pole to the N pole can be generated in the space surrounded by the iron core unit 133, so as to drive the magnetic bars 132 to rotate in accord with the direction of the magnetic field in the space. On the other hand, the opening 122 of the polarizer 120 can further support and fix the entire magnetic orientation unit 130, so that the magnetic orientation unit 130 is not easily displaced during the transportation of the display device 10. Of course, the magnetic orientation unit 130 may not be disposed in the opening portion 122. That is, the upper surface of the support film 150 of the magnetic orientation unit 130 may protrude from or be raised above the opening portion 122 as long as it can be located within the corresponding region of the camera 160.

As shown in FIG. 4 and FIG. 5, the electric coil 140 includes a first electric coil 141 and a second electric coil 142. The first electrical coil 141 and the second electrical coil 142 are both wound on the iron core unit 133 and are arranged on opposite sides. The magnetic fields generated by the first electric coil 141 and the second electric coil 142 are identical. In this way, by setting two electric coils 140, the directions of the magnetic fields formed by the two electric coils 140 after being energized are consistent, so that the magnetic bars 132 can be rotated in a uniform direction. Furthermore, the stability of the formed magnetic field can be ensured, so that after the magnetic bars 132 are rotated in accord with the direction from the S pole to the N pole, the magnetic fields on both sides can achieve a balance. As such, the magnetic bars 132 are not easy to shake left and right, and the stability is higher after rotation, so that the oriented state in the magnetic orientation unit 130 and the oriented state in the opposite polarizer 120 are always kept in a stable perpendicular state, thereby ensuring the shading effect. Of course, only one electric coil 140 may be provided to be able to achieve the shading effect, but the shading effect at this time is relatively poor.

The magnetic bars 132 may be made of a soft magnetic material, specifically any one of iron, nickel, iron-cobalt alloy, soft ferrite, and iron-aluminum alloy. On the one hand, since the soft magnetic material is easy to rotate in the direction of the magnetic field when it encounters a magnetic field, it can be driven even when the magnetic force of the magnetic field is relatively small, thereby reducing the kinetic energy. On the other hand, after the magnetic field of the soft magnetic material disappears, the magnetic property of the soft magnetic material will fade faster, so it is relatively easy to control and the efficiency is relatively high. Of course, the magnetic bar 132 can also be made of non-soft magnetic materials, which can not only realize the formation of oriented slits 135 after rotation when there is a magnetic field, but also when the magnetic field that drives the rotation disappears and the magnetic bars 132 have not completely lost the magnetism, the magnetic bars 132 of the same S pole or N pole will repel each other, which can cause the magnetic bars 132 to be in a disorderly arrangement under the action of the mutual repulsion force, thereby realizing light transmission.

Furthermore, in this embodiment, the iron core unit 133 may be circular or rectangular. The size of the magnetic orientation unit 130 may be consistent with the size of the camera 160. Of course, in order to ensure better imaging effect of the camera 160, the magnetic orientation unit 130 can be made larger. That is, the iron core unit 133 is arranged on the outer periphery of the region corresponding to the camera 160, so that in the region corresponding to the entire camera 160 the orientation is able to change. When this region is in a light-transmitting state, relatively more light is admitted, so the brightness is relatively higher, and the imaging effect of the camera 160 is relatively better.

Figure 6:
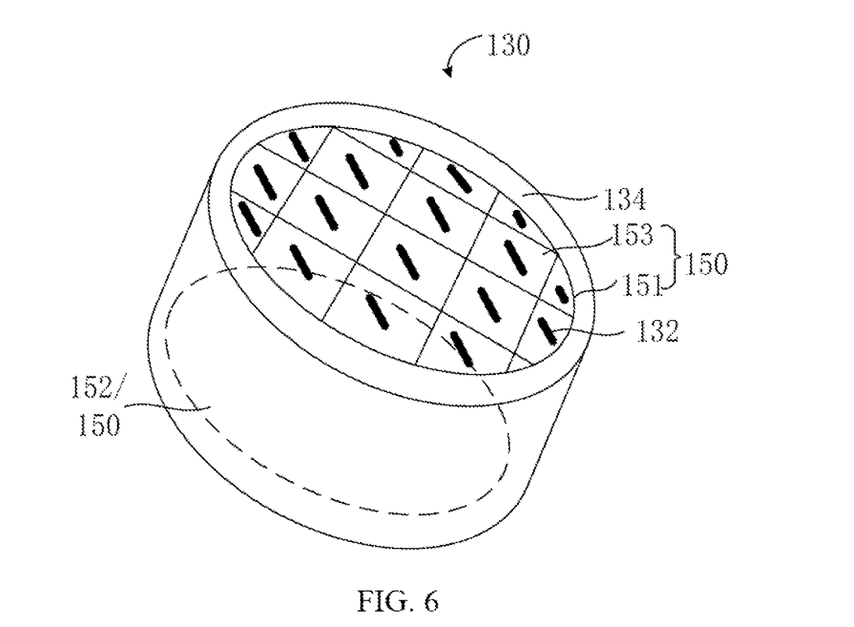
FIG. 6 is a schematic diagram of an overall structure of the magnetic orientation unit provided by the first embodiment of the present application.

FIG. 6 is a schematic diagram illustrating the overall structure of the magnetic orientation unit 130 provided in the first embodiment of the present application. As shown in FIG. 6, the support film 150 includes an upper support film 151 and a lower support film 152. The upper support film 151 is attached to the lower support film 152. The lower support film 152 is provided with grid-shaped grooves 153. The openings of the grid-shaped grooves 153 face the upper support film 151, and form a plurality of closed spaces with the upper support film 151. The magnetic bars 132 are arranged in the closed spaces, and are in one-to-one correspondence with the plurality of closed spaces. That is, one magnetic bar corresponds to one closed space. The cross-sectional area of each closed space is larger than the circular area swept by the corresponding magnetic bar 132 when it is rotated with the length of the magnetic bar 132 being the radius. By defining the grid-shaped grooves 153 in the lower support film 152 to limit the positions of the magnetic bars 132, each magnetic bar 132 can only be rotated in the space of the corresponding grid-shaped groove 153. No matter whether the magnetic bar 132 is rotated about the midpoint of its own length or about one end of its own length, the space for rotated is large enough and will not collide with the side wall of the closed space to affect the rotated effect. The grid-shaped grooves 153 can be formed by pressing with a mold, or by pressing in the lower support film 152 at 150° C. to 200° C. using a solvent casting method. The manufacturing process is also relatively simple, and there is no need to make a separate structure. The upper support film 151 and the lower support film 152 may be made of triacetate cellulose (TAC), polyvinyl alcohol (PVA), or other materials.

Furthermore, the size of a single magnetic bar 132 lies in the range of 1 um-20 um, the thickness of the entire support film 150 lies in the range of 100 um-200 um; the spatial distance between the upper support film 151 and the lower support film 152 lies in the range of 25 um-35 um. The support film 150 ensures sufficient support force, and at the same time, the magnetic bar 132 has enough space to switch between the oriented state and the non-oriented state, which is convenient.

Figure 7:
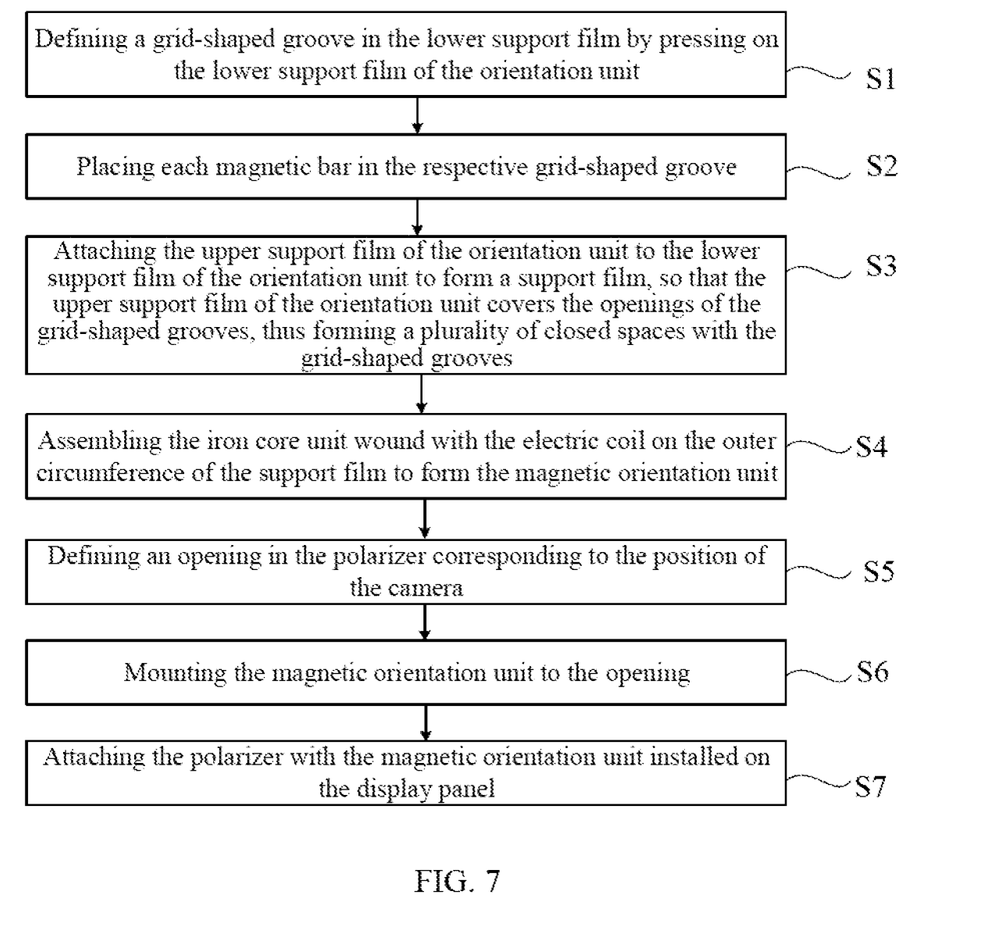
FIG. 7 is a schematic flowchart of manufacturing a display device provided by the first embodiment of the present application.

In addition, FIG. 7 is a schematic flowchart of manufacturing the display device provided by the first embodiment of the present application. As shown in FIG. 7, this embodiment further discloses a method for manufacturing a display device, which is used for manufacturing the above-mentioned display device, including the following steps:

S1: defining a grid-shaped groove by pressing on the lower support film of the orientation unit;

S2: correspondingly placing the magnetic bar in the grid-shaped groove;

S3: attaching the upper support film of the orientation unit to the lower support film of the orientation unit to form a support film, so that the upper support film of the orientation unit covers the openings of the grid-shaped grooves, thus forming a plurality of closed spaces with the grid-shaped grooves;

S4: assembling the iron core unit wound with the electric coil on the outer circumference of the support film to form the magnetic orientation unit;

S5: defining an opening in the polarizer corresponding to the position of the camera;

S6: mounting the magnetic orientation unit to the opening;

S7: correspondingly attaching the polarizer with the magnetic orientation unit installed on the display panel.

Step S3 may also include sticking a protective film on the upper support film, including sticking a pressure-sensitive adhesive layer on the side of the lower support film away from the grid-shaped grooves, and then sticking a layer of release film on the pressure-sensitive adhesive layer, which can make the structure supporting the membrane more stable and resistant to wear.

The display device produced in this way can have a function suitable for the camera under the screen. The principle is the same as above, and will not be repeated here.

Figure 9:
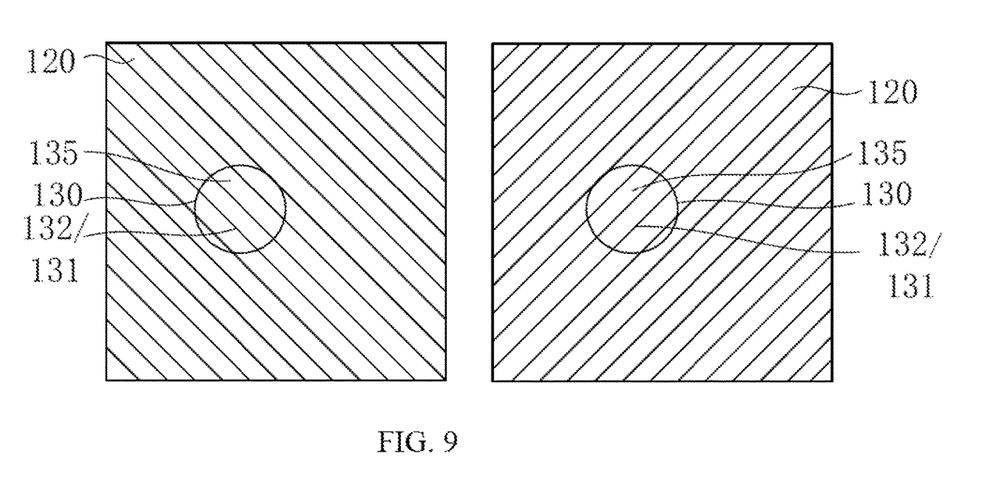
FIG. 9 is a schematic diagram of an oriented state of a polarizer of the display device provided by the second embodiment of the present application.

Embodiment 2:

FIG. 8 is a schematic diagram of a display device provided by a second embodiment of the present application. FIG. 9 is a schematic diagram illustrating an oriented state of a polarizer of the display device provided by the second embodiment of the present application. FIG. 10 is a schematic diagram illustrating an non-oriented state of the magnetic orientation unit region of the polarizer provided by the second embodiment of the present application. As shown in FIGS. 8-10, the difference between this embodiment and the first embodiment is that the two polarizers 120 are each provided with the magnetic orientation unit 130, and the two magnetic orientation units 130 are arranged opposite to each other. When the orientation control unit 133 is energized, the oriented slit 135 formed by the rotation of the magnetic bars 132 of one of the magnetic orientation units 130 is perpendicular to the oriented slit 135 formed by the rotation of the magnetic bars 132 of the opposite magnetic orientation unit 130. Thus, all regions of the two polarizers are in a state where the oriented slits 135 are perpendicular to each other, so the region corresponding to the camera 160 is in an opaque state, and the camera is not able to image due to insufficient light. When the orientation control unit 133 is not energized, the magnetic bars 132 of the two magnetic orientation units 130 are arranged in disorder, and the two magnetic orientation units are in a non-oriented state. Therefore, the region corresponding to the camera 160 is in a light-transmitting state, and the camera can realize the imaging function. With such a design, when the camera 160 is in use, the two magnetic orientation units 130 can achieve greater light transmittance. Most of the light incident from the region corresponding to the camera can pass through the polarizers in this region. At this time, more light penetrates into the region of the camera 160 to ensure the brightness of the camera 160, and the imaging effect of the camera 160 is relatively better. The two magnetic bar structures 131 may be electrically connected to each other, that is, only one conductive wire needs to be used to connect to the power supply assembly of the display device 10. At this time, only one current needs to be passed in, and the orientation change of the magnetic bars 132 in the two magnetic bar structures 131 can be controlled at the same time. Of course, the two magnetic bar structures 131 can also be connected to the power supply assembly of the display device 10 through their respective conductive wires. At this time, it is necessary to supply currents to the two magnetic bar structures 131 respectively, so as to change the orientations of the magnetic bars 132 in the two magnetic bar structures 131.

Figure 11:
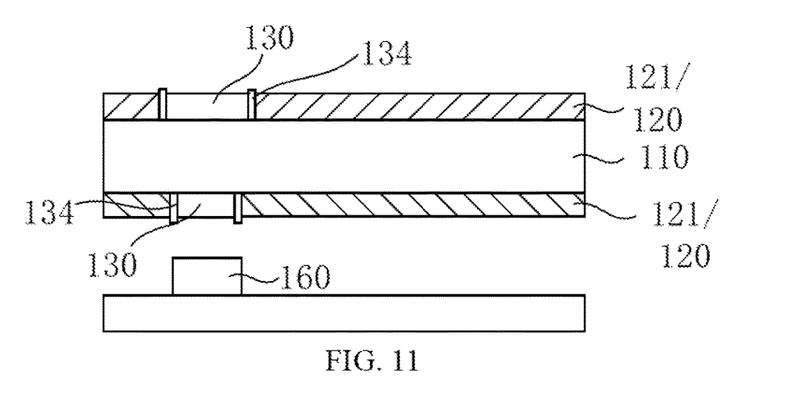
FIG. 11 is a schematic diagram of a display device provided by a third embodiment of the present application.

Embodiment 3:

FIG. 11 is a schematic diagram of a display device provided by a third embodiment of the present application. As shown in FIG. 11, the difference between this embodiment and the second embodiment is that the area of the magnetic orientation unit 130 on the polarizer 120 adjacent to the light incident side of the external light is larger than the area of the magnetic alignment unit 130 on the polarizer 120 away from the light incident side of the external light. In this way, on the one hand, there are more light rays incident from the light incident surface, and more light rays penetrate into the magnetic orientation unit 130 adjacent to the camera 160 after being reflected and refracted after entering. On the other hand, when the portion of the magnetic orientation unit 130 on the polarizer 120 that is adjacent to the incident direction of the external light extends beyond the magnetic alignment unit 130 on the polarizer 120 disposed opposite to it to form a non-oriented state, the magnetic orientation unit 130 on the polarizer 120 adjacent to the incident direction of the external light can also form a light-transmitting state with the region of the opposite polarizer body, and can also transmit more incident light, and the brightness of the camera 160 can be relatively better.

It should be noted that the inventive concepts of the present application are not limited to the above description, but the length of the application document is limited and so these inventive concepts cannot be one by one. For those having ordinary skill in the technical field to which this application pertains, numerous simple deductions or substitutions may be made without departing from the concept of this application, which shall all be regarded as falling in the scope of protection of this application.

What is claimed is:

1. A display device, comprising a display panel and two polarizers, wherein the display panel is disposed between the two polarizers; wherein at least one of the two polarizers comprises a polarizer body which comprises an opening corresponding to a camera; wherein the polarizer having the opening further comprises a magnetic orientation unit arranged corresponding to the opening;
wherein the magnetic orientation unit comprises a magnetic bar structure and an orientation control unit; wherein the magnetic bar structure comprises a plurality of magnetic bars, wherein the orientation control unit is configured for generating a magnetic field after being energized to control a rotation of the plurality of magnetic bars;
wherein when the orientation control unit is energized, the plurality of magnetic bars are rotated and arranged to define an oriented slit, which is perpendicular to an oriented slit of the oppositely arranged polarizer; and wherein when the orientation control unit is not energized, the plurality of magnetic bars are arranged disorderly and are not perpendicular to the oriented slit of the oppositely arranged polarizer.

2. The display device of claim 1, wherein the orientation control unit comprises an iron core unit, an electric coil, and a support film; wherein the plurality of magnetic bars are arranged in the support film, wherein the electric coil is wound on the iron core unit and configured to generate a magnetic field after being energized; wherein the iron core unit is sleeved on a periphery of the support film.

3. The display device of claim 2, wherein each of the plurality of magnetic bar is made of a soft magnetic material.

4. The display device of claim 3, wherein the plurality of magnetic bars are made of at least one selected from the group consisting of iron, nickel, an iron-cobalt alloy, a soft ferrite, and an iron-aluminum alloy.

5. The display device of claim 2, wherein the support film comprises an upper support film and a lower support film, the upper support film being attached to the lower support film; wherein the lower support film comprises a plurality of grid-shaped grooves, which each have an opening facing toward the upper support film and define a plurality of closed spaces together with the upper support film;
wherein the plurality of magnetic bars are in one-to-one correspondence with the plurality of closed spaces and are disposed in the plurality of closed spaces, respectively;
wherein a cross-sectional area of each closed space is greater than a circular area swept by the respective magnetic bar in rotation with a length of the magnetic bar as a radius.

6. The display device of claim 5, wherein a size of each individual magnetic bar lies in the range of 1 um~20 um, wherein a thickness of the whole support film lines in the range of 100 um~200 um; and wherein a spatial distance between the upper support film and the lower support film lies in the range of 25 um-35 um.

7. The display device of claim 2, wherein the electric coil comprises a first coil and a second coil, each wound on the iron core unit and oppositely arranged; wherein magnetic fields generated by the first coil and the second coil have identical directions.

8. The display device of claim 2, wherein the magnetic orientation unit is disposed in the respective opening, and an outer wall of the iron core unit is attached to an inner wall of the respective opening.

9. The display device of claim 2, wherein an outer wall of the iron core unit is attached to an inner wall of the opening portion.

10. The display device of claim 2, wherein an upper surface of the support film of the magnetic orientation unit protrudes from the opening portion, and is disposed corresponding to the area of the camera.

11. The display device of claim 2, wherein the plurality of magnetic bars are made of a non-soft magnetic material.

12. The display device of claim 2, wherein the iron core unit is circular or rectangular.

13. The display device of claim 2, wherein the plurality of grid-shaped grooves are formed by pressing using a mold or by pressing in the lower support film at 150° C. to 200° C. using a solvent casting method.

14. The display device of claim 1, wherein the magnetic orientation unit is only disposed in the polarizer adjacent to the camera;
wherein when the orientation control unit is energized, the oriented slit defined by the rotation of the plurality of magnetic bars is perpendicular to the oriented slit of the oppositely disposed polarizer; and
wherein when the orientation control unit is not energized, the magnetic bars of the magnetic orientation unit are arranged disorderly.

15. The display device of claim 1, wherein the magnetic orientation unit is arranged in each of the two polarizers, and the two magnetic orientation units are oppositely arranged;
wherein when the orientation control unit is energized, the oriented slit defined by the rotation of the magnetic bars of one of the magnetic orientation units is perpendicular to the oriented slit defined by the rotation of the magnetic bars of the oppositely disposed magnetic orientation unit; and
wherein when the orientation control unit is not energized, the magnetic bars of each of the two magnetic orientation units are arranged disorderly.

16. The display device of claim 15, wherein an area of the magnetic orientation unit in the polarizer adjacent to a light incident side of external light is greater than an area of the magnetic orientation unit in the polarizer facing away from the light incident side of the external light.

17. The display device of claim 1, wherein the magnetic orientation unit is disposed on the polarizer at a side of an outside light incident surface; wherein when the magnetic orientation unit is energized, the plurality of magnetic bars are rotated and arranged to define an oriented slit, which is perpendicular to an of the oppositely arranged polarizer; and wherein when the orientation control unit is not energized, the plurality of magnetic bars are arranged disorderly.

18. An electronic apparatus, comprising a camera and a display device, wherein the display device comprises a display panel and two polarizers, wherein the display panel is disposed between the two polarizers; wherein at least one of the two polarizers comprises a polarizer body which comprises an opening corresponding to a camera; wherein the polarizer having the opening further comprises a magnetic orientation unit arranged corresponding to the opening; wherein the magnetic orientation unit comprises a magnetic bar structure and an orientation control unit; wherein the magnetic bar structure comprises a plurality of magnetic bars, wherein the orientation control unit is configured for generating a magnetic field after being energized to control a rotation of the plurality of magnetic bars; wherein when the orientation control unit is energized, the plurality of magnetic bars are rotated and arranged to define an oriented slit, which is perpendicular to an oriented slit of the oppositely arranged polarizer; and wherein when the orientation control unit is not energized, the plurality of magnetic bars are arranged disorderly and are not perpendicular to the oriented slit of the oppositely arranged polarizer; and wherein the camera is disposed corresponding to the opening of the display device.

\* \* \* \* \*